US009208562B1

(12) United States Patent
Santoro et al.

(10) Patent No.: US 9,208,562 B1
(45) Date of Patent: Dec. 8, 2015

(54) METHOD FOR SYNCHRONIZED NAVIGATION OF SETS OF TWO OR MORE BIOMEDICAL IMAGES

(71) Applicants: Matteo Santoro, Genoa (IT); Curzio Basso, Genoa (IT); Sofia Mosci, Genoa (IT); Mario Esposito, Genoa (IT)

(72) Inventors: Matteo Santoro, Genoa (IT); Curzio Basso, Genoa (IT); Sofia Mosci, Genoa (IT); Mario Esposito, Genoa (IT)

(73) Assignee: CAMELOT BIOMEDICAL SYSTEMS SRL, Genoa (IT)

( * ) Notice: Subject to any disclaimer, the term of this patent is extended or adjusted under 35 U.S.C. 154(b) by 0 days.

(21) Appl. No.: 14/714,152

(22) Filed: May 15, 2015

(30) Foreign Application Priority Data

May 20, 2014 (IT) ............................. GE2014A0048

(51) Int. Cl.
*G06K 9/00* (2006.01)
*G06T 7/00* (2006.01)
*G06K 9/44* (2006.01)
*G06K 9/62* (2006.01)
*G06T 15/08* (2011.01)

(52) U.S. Cl.
CPC ............. *G06T 7/0024* (2013.01); *G06K 9/44* (2013.01); *G06K 9/6215* (2013.01); *G06T 7/0044* (2013.01); *G06T 15/08* (2013.01); *G06T 2207/10072* (2013.01); *G06T 2207/10116* (2013.01); *G06T 2207/10132* (2013.01); *G06T 2207/30004* (2013.01)

(58) Field of Classification Search
CPC .. A61B 2019/5289; A61B 6/00; A61B 6/037; G01T 1/1644; G06T 11/00; G06T 15/503; G06T 2210/41
See application file for complete search history.

(56) References Cited

U.S. PATENT DOCUMENTS

| 7,117,026 | B2* | 10/2006 | Shao ..................... G06T 7/0038 600/407 |
| 7,672,540 | B2* | 3/2010 | Sun ........................ G06T 7/0012 382/128 |
| 7,912,259 | B2* | 3/2011 | Arditi ................... G06T 7/0034 382/128 |
| 7,945,117 | B2* | 5/2011 | Hermosillo Valadez ............... G06K 9/6206 382/128 |
| 8,326,086 | B2* | 12/2012 | Carlsen ................. G06T 3/0068 382/103 |
| 8,788,012 | B2* | 7/2014 | Ubelhart ................. A61B 6/032 382/131 |
| 9,008,462 | B2* | 4/2015 | Akhbardeh ............ A61B 6/032 128/922 |
| 2006/0004275 | A1 | 1/2006 | Vija |
| 2006/0074292 | A1* | 4/2006 | Thomson ............. A61N 5/1039 600/411 |

FOREIGN PATENT DOCUMENTS

WO 2010082096 7/2010

OTHER PUBLICATIONS

Lee J S et al: Fusion of coregistered cross-modality images using a temporally alternating display method, Medical & Biological Engineering & Computing, Springer, Berlin, DE, vol. 38 No. 2, Mar. 1, 2000, pp. 127-132 Abstract.

(Continued)

*Primary Examiner* — Tom Y Lu
(74) *Attorney, Agent, or Firm* — Themis Law

(57) ABSTRACT

A method for concurrent navigation of sets of a plurality of biomedical images includes visualizing, side-by-side or in overlay, sets of two biomedical images that include a reference image A and a comparison image B. The method for visualizing comparison image B is based only on the rigid component of the non-rigid transformation applied to comparison image B.

14 Claims, 2 Drawing Sheets

(56) References Cited

OTHER PUBLICATIONS

Spetsieris P G et al: Intercative visualization of coregistered tomographic images, Biomedical Visualization, 1995 Proceedings, Atlanta, GA Oct. 30-Nov. 3, 1995, Los Alamitos, CA IEEE Comput. Soc. US, Oct. 30, 1995, pp. 58-63, 86 Abstract.

Kelvin K.Leung et al: Automatic Quantification of Changes in Bone in Serial MR Images of Joints, IEEE Transactions on medical imaging, IEEE Service Center, Piscataway, NJ, vol. 25, No. 12, Dec. 1, 2006, pp. 1617-1626 Abstract.

* cited by examiner

METHOD FOR SYNCHRONIZED NAVIGATION OF SETS OF TWO OR MORE BIOMEDICAL IMAGES

FIELD OF THE INVENTION

The present invention is in the field of imaging technologies for healthcare.

In particular, the present invention concerns a method of navigating across and visualizing in a synchronic way sets of two or more biomedical images.

The present invention can be applied to images belonging, for instance, to a longitudinal study, that is, a study related to comparing images of the same patient and of the same anatomical district that have been acquired with the same modality and acquisition protocol or at different times, with a multiparametric/multi-modal study, that is, related to comparing images acquired with different modalities or acquisition protocols.

The present invention finds application as a support technology in different phases of patient care, such as diagnosis, pre-surgical planning, and intraoperative guidance.

The work leading to the present invention has received funding from the European Union's Seventh Framework Programme (FP7/2007-2013) under grant agreement no. 611963.

BACKGROUND OF THE INVENTION

The analysis of radiological images, and of biomedical images in general, is frequently based on the comparison of two or more images of the same patient and of the same anatomical district acquired at different times and/or with different modalities or acquisition protocols. Such a comparison is referred to as corresponding "views" among the two or more images under study.

The definition of "view" differs according to the type of image under study. In particular, in the case of 2d images, with "view" we refer to a subset of pixels of the original image, having an extension that may range from a single pixel to the entire image. Conversely, in the case of 3d images, with "view" we refer to a subset of voxels of the original image laying on a section that can be either axial, coronal, sagittal or oblique, and the extension may range from a single voxel to the entire section.

Once a view VA has been identified in an image A, the manual search of the corresponding view in B, VB, is a time consuming operation. This is described for instance in document US2007230761 (A1).

Automatic or semi-automatic registration techniques allow accelerating this phase, as they (semi-) automatically identify the view VB in image B corresponding to VA.

Registration can be either rigid (that is, based on an affine transformation) or non-rigid. The non-rigid registration is necessary for images that are not completely overlapping due to changes in the anatomy caused, for instance, by patient motion during acquisition in the case of dynamic images, or by tumor evolution over time in the case of images acquired at different times.

Once the registration R is completed, some visualization systems visualize the two views VA and VB without any further elaboration, while others apply to VB the transformation TR corresponding to the registration R. In that latter case the visualization refers to VA and TR(VB). It is important to notice that, in the case of a non-rigid registration, it may happen that a view VA corresponds to a view VB in B. which lies on a non-planar surface, and the 2d visualization is thus not possible unless some transformation TR or some other deformation (such as a projection) is applied to VB.

Once the registration R is completed and the eventual transformation TR is applied, given a view VA in A, the corresponding view VB in B can be visualized either side-by-side (this type of visualization is typically referred to as "parallel" or "synchronized" visualization, as the choice of visualization for A automatically induces the visualization choice for B) or overlaid to VA (this type of visualization is typically referred to as "fusion"), with transparence level settable by the user, in which the second view can be either VB itself or the transformed view TR(VB).

Both visualization modes, overlaid or parallel, have a set of advantages and drawbacks that make the user prefer one mode or the other depending on the particular context.

In particular the overlaid visualization has the following advantages:

Point-wise correspondence, for which it might, however, be necessary to resort to a non-rigid transformation;

The corresponding elements of the two or more images are in the same field of view, as they are exactly overlapping, and it is thus not necessary that the user change its gaze in order to compare the two views.

At the same time the overlaid visualization has the following disadvantages:

Low reliability for diagnostic purposes, pre-surgical planning or intra-operative guidance in the case of registration different from a purely affine transformation; as already mentioned, in the case of not perfectly overlapping views, in order to overlap view VB to view VA, the former must be transformed according to the registration; view VB is thus deformed with respect to the acquisition and may no longer reflect the original shape and dimensions; as such it cannot be used for taking any measure for diagnostic purposes, pre-surgical planning or intra-operative guidance; in general, even for a qualitative analysis, image deformation has obvious consequences on the diagnostic reliability;

Excess of information in the same point, in the case of three or more images; in such a case, in fact, without any further elaboration of the original images, by fusing three or more views, in the same point an excess of information is obtained, which is not easy to interpret and is thus not useful for diagnosis, pre-surgical planning or intra-operative guidance.

The parallel visualization mode, instead, has the following advantages:

It is effective, without necessarily having to resort to non-rigid transformation; for instance, for a transformation composed of a rotation, a translation and a scaling factor along a certain direction, it is possibly to apply to B only the rotation and translation thus avoiding the deformation caused by the scaling factor;

It can be applied also to three or more images, if the screen dimension and resolution allow it.

At the same time the parallel visualization mode, instead, has the following disadvantages:

The correspondence is defined over entire regions and it is not point-wise, as it is based on global rigid transformation; this means that the region in its complexity is indeed registered correctly, while a single anatomical element within the region may appear translated, shrunk or even disappear in one or more views of the images other than A;

In order to compare the same anatomical point on two or more different images, the operator necessarily has to change his/her field of view, thus reducing the overall efficiency of the analysis; this limitation was already faced in similar contexts: for instance in US2010201708(A1), the attention is brought on the problem that the operator is distracted by the need to change the eye fixation (the mentioned patent is related to a single image which is the result of the fusion of two images and the problem is related to the fact that the operator has to change the gaze from the fused image to a menu bar in order to be able to change the images which are fused together);

Impossibility of visualizing side-by-side original images in the case of non-rigid registration; in fact, it may happen that a planar view VA corresponds to a non-planar view VB in B, so that the visualization of the non-planar view VB is impossible unless some further deformation is applied (such as a projection).

SUMMARY OF THE INVENTION

In view of the disadvantages relative to the above described visualization modes, an object of the present invention is the concurrent visualization of corresponding views between two or more images, wherein such visualization exploits the rigid component of the transformation obtained from the non-rigid registration applied to the images. On the one hand, such a method provides for an accurate mapping of points from one image to the other, and on the other hand, in the visualization phase it allows avoiding image deformation, thus providing diagnostic reliability.

The method is composed of a series of steps starting from two or more non-completely overlapping images:

(a) Definition of a reference image A and of at least one comparison image B;

(b) Execution of a non-rigid registration R of the comparison image B on the reference image A and saving, for each point P in B, the transformation TR obtained from the registration R;

(c) Visualization of a reference view VA of the reference image A and selection of a reference point PA in the reference view VA;

(d) Identification, on the comparison image B registered on the reference image A, of the comparison point PB corresponding to the reference point PA, by using TR;

(e) Concurrent visualization of the reference view VA and of at least part of the comparison view VB of the comparison image B, wherein view VB contains the comparison point PB and is based only on the rigid component of the non-rigid transformation TR relative to the comparison point PB, and wherein the rigid component comprises a rotation and/or a translation and/or a scaling factor.

The first step, relative to items (a) and (b), consists of a non-rigid registration defined with the goal of mapping each point of the second (and of the possible successive) image B on the reference image A. This way, when the user selects a point in A, the point in B corresponding to the selected point in A is automatically identified.

In an alternative working form, rather than performing a registration on the images, the method employs the one or more results of a previously completed non-rigid registration R for one or more comparison images B with respect to a reference image A.

The selection of the reference point PA can be performed, for instance, by means of pointing devices, such as a mouse, touchpad, or touch screen.

In a first working example, the reference view VA and the comparison view VB corresponding to the reference view VA are visualized side-by-side.

This way, the view in image B containing the point of B corresponding to the point selected by the user in A is visualized side-by-side with the view of A. The view of B is generated by using the rigid component—or just a part of the rigid component—of the transformation resulting from the non-rigid registration between A and B on the selected point.

The advantages of this approach are the following:

(a) The deformation of B is not necessary;

(b) It can be applied to three or more images;

(c) There is point-wise correspondence.

It is however still necessary that the operator changes the gaze in order to compare the two images.

In a second working example, the following steps are considered:

(a) User definition of the shape and dimension of a reference region IA centered in A on the reference image A;

(b) Identification, based only on the rigid component of the transformation TR relative to the comparison point PB, of a region IB centered in the comparison point PB and corresponding to the reference region IA;

(c) Generation of the comparison view VB' relative to the comparison region IB;

(d) Visualization of the comparison view VB' relative to the comparison region IB on the reference view VA overlaid on the reference region IA.

This way, a region which is a neighborhood of the selected point on A is defined, and the corresponding region on B is identified, based on the rigid component of the transformation TR resulting from the non-rigid registration between A and B defined on the selected point. Such a region in B is visualized overlaid to the region in A.

The advantages of this approach are the following:

(a) The deformation of B is not necessary;

(b) It can be applied to three or more images;

(c) There is point-wise correspondence;

(d) It is not necessary that the operator changes the gaze in order to compare the two images.

However, the field of view of image B is limited because not the entire view of B is visualized but only its subset, that is, the neighborhood of PB.

In a third working example, which is particularly useful, the two previously described working examples are combined, thus enabling a visualization of the two views of A and B side-by-side, while the neighborhood of PB is overlaid to VA. This allows comparing the neighborhood of the selected point without having to change the field of view due to the overlaid visualization, but also provides for a more detailed analysis of the larger neighborhood due to the side-by-side visualization.

In an embodiment, in the comparison view VB the comparison point PB is enhanced by means of a cross or other symbol of a color contrasting with the image color.

In another embodiment, a plurality of comparison images B is considered, and the comparison view VB of the comparison images B containing the reference points PB corresponding to the reference view VA are alternatively visualized by means of appropriate user interactions. Such interactions may be to the movement of the scroll wheel of a mouse or similar actions. This way, the user can see the comparison views once at a time together with the reference view VA and choose which one shall be visualized.

In still another embodiment, the transformation TR comprises a global rigid transformation and a local non-rigid transformation, such that the rigid component of the transformation is the same for each point P of the comparison image B.

In still another embodiment, the part of the rigid component of the transformation TR used for defining the comparison view VB is the entire rigid component, or, in the case of volumetric images, the component of translation along the axes orthogonal to the reference view VA.

The proposed method is appropriate for every type of biomedical images, possibly including, but not limited to, DICOM images from one or more of, but not restricted to, the following image acquisition devices: a positron emission tomography (PET) device; a x-ray computed tomography (CT) device; a magnetic resonance imaging (MRI) device; an ultrasound (US) device; a digital microscope; a digital slide scanner; and other devices capable of acquiring biomedical images either in DICOM format or other formats.

The images can be also the result of the fusion of two or more biomedical images.

The third working example is summarized in a method having the following steps:

(a) User input of a reference image A and of at least one comparison image B and of the result of a previously completed non-rigid registration and the corresponding transformation TR;

(b) Where not yet performed, execution of a non-rigid registration R of B on A and saving, for each point P in B, the transformation TR obtained from R;

(c) User definition of a view VA in A;

(d) Visualization of view VA;

(e) User input of a point PA on the view VA, for instance by means of a pointing device;

(f) Identification of the corresponding point PB by means of TR on each comparison image registered on A;

(g) Side-by-side visualization of view VA and view VB of the image B, containing VB and corresponding to view VA, wherein the view VB is obtained based on the rigid component of the transformation TR(PB), or procedures relative to the rigid component of the transformation TR;

(h) Selection of additional comparison images B, by means of appropriate user interactions (such as by scrolling the mouse wheel);

(i) Identification of a region IA centered in PA having user defined shape and dimension, (i1) Identification of a region IB centered in PB and corresponding to IA based on the rigid component of the transformation TR;

(i2) Generation of the corresponding view TR(IB), or VB', corresponding to IA;

(i3) Visualization, on the view VA, of the view TR(IB), or VB', overlaid on region IA.

BRIEF DESCRIPTION OF THE DRAWINGS

This and other advantages of the present invention will be clarified by the following description of some working examples, which are illustrated in the attached drawings, in which.

DETAILED DESCRIPTION OF EMBODIMENTS OF THE INVENTION

Figure 1:
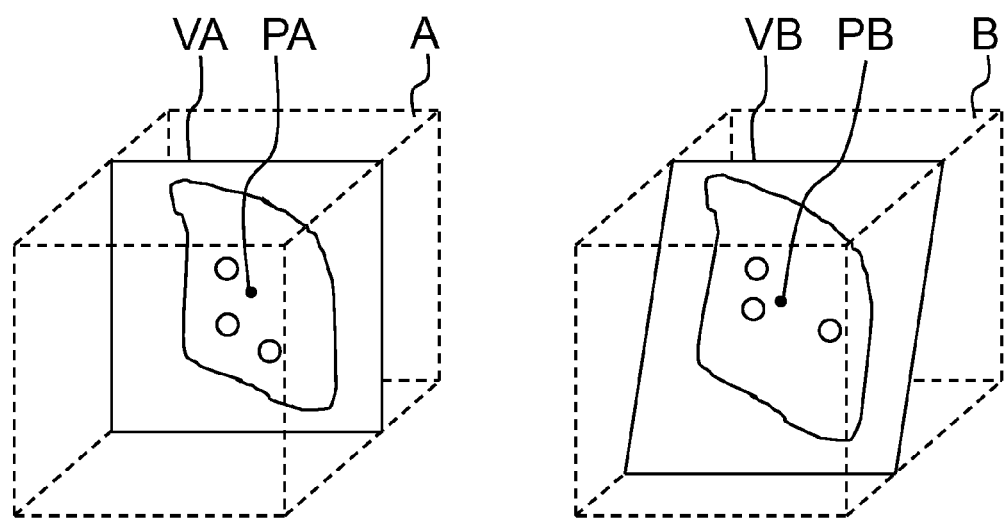
FIG. 1 illustrates a schematic view of two volumetric images.

FIG. 1 shows a volumetric reference image A and a volumetric comparison image B.

Images A and B can also be two-dimensional. A plurality of comparison images B may be considered.

A view VA of the reference image is chosen and a point PA is selected in this view VA by the user.

The anatomical structures in view VA and their corresponding points of interest are shown and indicated with small circles in the figure.

A non-rigid registration is thus performed with the goal of mapping each point of the comparison image B on the reference image A.

The registration can be performed by means of any known registration method.

The non-rigid registration R associates each point or voxel of the comparison image B with a point or voxel of the reference image A.

This way, when the user selects a point PA in the image A, the point PB corresponding to the point PA selected in A is automatically recognized.

A transformation TR corresponds to the non-rigid registration R, according to which the comparison image B is overlapping on the reference image A.

When the user selects the reference point PA, the comparison point PB in the comparison image B is automatically identified.

The comparison view VB is generated, containing the point PB corresponding to the point selected by the user on A. It is generated using the rigid component—or only part of the procedures related to it—of the transformation TR resulting from the non-rigid registration between A and B defined on the selected point PA.

Figure 2:
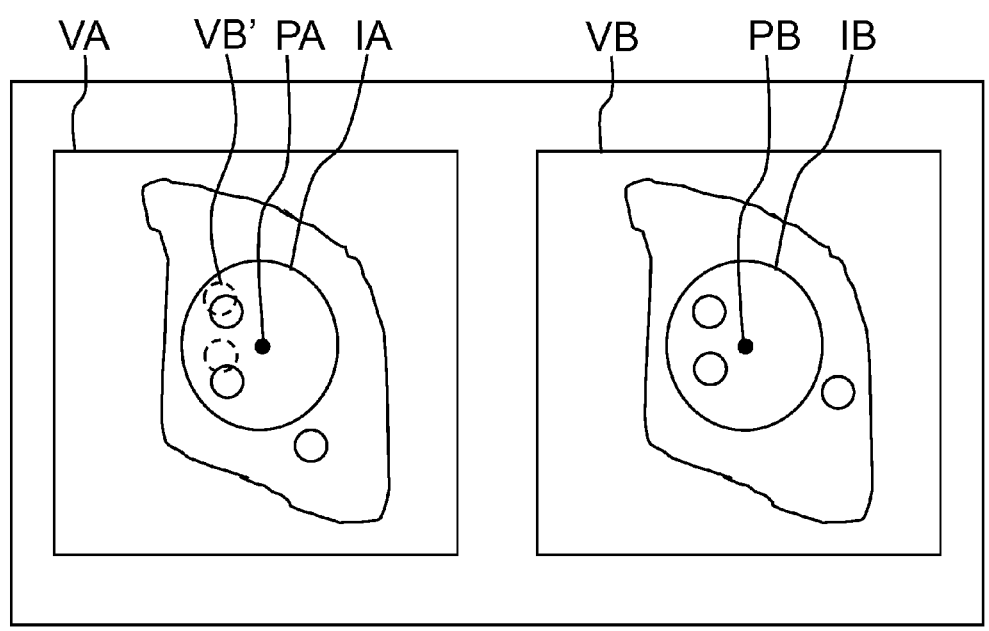
FIG. 2 illustrates a working example of visualization.

A working example of visualization is shown in FIG. 2.

The reference view VA and the comparison view VB are visualized side-by-side.

As one can notice, the points of interest are differently placed in VA and VB as the view VB is generated by using only the rigid component of the transformation TR.

The misalignments shown in the figure can be due, for instance, to organ motion during a dynamic image.

Moreover, the user can define a region IA, which is a neighborhood of a point PA selected by the user, and the corresponding region IB on B is identified, based on the rigid component of transformation TR resulting from the non-rigid registration between A and B defined on the selected point PA.

Such a region IB on B is indeed the comparison view VB' and is visualized overlaid to region IA on A.

The points of interest in VB' are displayed on IA with dashed circles.

The method thus provides for visualizing the view of A and B side-by-side, while on A the region defined on B is visualized in overlay.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become apparent to those skilled in the art and the scope of the present invention is limited only by the appended claims.

The invention claimed is:

1. A method of concurrently navigating sets of a plurality if biomedical images comprising:
 defining a reference image (A) and a comparison image (B);
 executing a non-rigid registration (R) of the comparison image (B) on the reference image (A) and saving, for each point (P) of the comparison image (B), a transformation (TR) obtained from the registration (R);
 visualizing a reference view (VA) of the reference image (A) and selecting a reference point (PA) in the reference view (VA);

identifying, on the comparison image (B) registered on the reference image (A), a comparison point (PB) corresponding to the reference point (PA) by using the transformation (TR); and concurrently visualizing the reference view (VA) and a comparison view (VB, VB') of the comparison image (B), wherein the comparison view (VB,VB') contains a comparison point (PB) and is defined based only on a rigid component of the transformation (TR) relative to the comparison point (PB), or is defined based on a translation, a rotation, or a scaling factor that are part of the rigid component of the transformation (TR) relative to the comparison point (PB).

2. The method according to claim 1, wherein the reference view (VA) and the comparison view (VB) are visualized side-by-side.

3. The method according to claim 2, wherein, in the comparison view (VB), the comparison point (PB) is highlighted.

4. The method according to claim 1, wherein a plurality of said comparison images (B) are considered and the comparison views (VB) of the comparison images (B) containing the comparison points (PB) and corresponding to the reference view (VA), are alternatively visualized by way of user interactions.

5. The method according to claim 1, wherein the transformation (TR) comprises a global rigid component and a local translation component, such that the rigid component of the transformation (TR) is the same for each point (P) of the comparison image (B).

6. The method according to claim 1, wherein a rigid component of the transformation (TR) used to define the comparison view (VB) is an entire rigid component or, for volumetric images, is a component consisting of a translation along axes orthogonal to the reference view (VA).

7. The method according to claim 1, further comprising:
providing a user definition of shape and dimension of a reference region (IA) centered in the reference point (PA) on the reference image (A);
identifying, based only on a rigid component of the transformation (TR) relative to the comparison point (PB), a comparison region (IB) centered in the comparison point (PB) and corresponding to the reference region (IA);
generating the comparison view (VB') relative to the comparison region (IB); and
visualizing the comparison view (VB') relative to the comparison region (IB) on the reference view (VA) overlaid on the reference region (IA).

8. A method of concurrently visualizing a navigation of sets of a plurality of biomedical images comprising:
defining one or more results of a non-rigid registration (R) that was previously completed and a corresponding transformation (TR) performed for one or more comparison images (B) relative to a reference image (A);
visualizing a reference view (VA) of the reference image (A) and selecting a reference point (PA) in the reference view (VA);
identifying, on a comparison image (B) registered on the reference image (A), a comparison point (PB) corresponding to the reference point (PA) by using the transformation (TR); and
concurrently visualizing the reference view (VA) and a comparison view (VB, VB') of the comparison image (B), wherein the comparison view (VB,VB') contains the comparison point (PB) and is defined based only on a rigid component of the transformation (TR) relative to the comparison point (PB), or based on a translation, a rotation, or a scaling factor that are part of the rigid component of the transformation (TR) relative to the comparison point (PB).

9. The method according to claim 8, wherein the reference view (VA) and the comparison view (VB) are visualized side-by-side.

10. The method according to claim 9, wherein, in the comparison view (VB), the comparison point (PB) is highlighted.

11. The method according to claim 8, wherein a plurality of said comparison images (B) are considered and the comparison views (VB) of the comparison images (B) containing the comparison points (PB) and corresponding to the reference view (VA), are alternatively visualized by way of user interactions.

12. The method according to claim 8, wherein the transformation (TR) comprises a global rigid component and a local translation component, such that the rigid component of the transformation (TR) is the same for each point (P) of the comparison image (B).

13. The method according to claim 8, wherein a rigid component of the transformation (TR) used to define the comparison view (VB) is an entire rigid component or, for volumetric images, is a component consisting of a translation along axes orthogonal to the reference view (VA).

14. The method according to claim 8, further comprising:
providing a user definition of shape and dimension of a reference region (IA) centered in the reference point (PA) on the reference image (A);
identifying, based only on a rigid component of the transformation (TR) relative to the comparison point (PB), a comparison region (IB) centered in the comparison point (PB) and corresponding to the reference region (IA);
generating the comparison view (VB') relative to the comparison region (IB); and
visualizing the comparison view (VB') relative to the comparison region (IB) on the reference view (VA) overlaid on the reference region (IA).

\* \* \* \* \*